US012701639B1

(12) United States Patent
LaValley et al.

(10) Patent No.: US 12,701,639 B1
(45) Date of Patent: Aug. 4, 2026

(54) SYSTEMS AND METHODS FOR PROVIDING AN AI-BASED COMPUTER-AIDED DISPATCH (CAD) DATA INTERFACE AT AN EMERGENCY COMMUNICATION CENTER (ECC)

(71) Applicant: RAPIDSOS, INC., New York, NY (US)

(72) Inventors: Zachery LaValley, Arlington, MA (US); Michael John Martin, Long Island City, NY (US); John Robert Katt, Bronx, NY (US); Martin Vejmelka, Prague (CZ); Denis Kristak, Hodonin (CZ); Conor Fucci, Brooklyn, NY (US); James Patrick Olejar, Fort Lauderdale, FL (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/411,122

(22) Filed: Dec. 5, 2025

Related U.S. Application Data

(60) Provisional application No. 63/786,517, filed on Apr. 10, 2025.

(51) Int. Cl.
*H04W 76/50* (2018.01)
*H04W 4/90* (2018.01)

(52) U.S. Cl.
CPC ............. *H04W 76/50* (2018.02); *H04W 4/90* (2018.02)

(58) Field of Classification Search
CPC ............................... H04W 76/50; H04W 4/90
See application file for complete search history.

(56) References Cited

U.S. PATENT DOCUMENTS

2024/0406309 A1 * 12/2024 Misiorny ................ G06F 40/35
2025/0211681 A1 * 6/2025 Bondareva ........... H04M 3/5116

* cited by examiner

*Primary Examiner* — Fred A Casca
(74) *Attorney, Agent, or Firm* — William J. Pigott; Michael L. Ross

(57) ABSTRACT

An emergency response system is operable to provide artificial intelligence (AI)-based CAD interface (e.g., read/write/action), in accordance with aspects of the disclosure. The emergency response system includes an emergency response data system (ERDS) that hosts emergency management applications that are operable on ECC computing systems. Client-side components and/or back-end components work together in concert with agentic AI (e.g., an AI agent, one or more large language models (LLMs), machine learning (ML), etc.) to extract CAD data from a screenshot of a CAD user interface (UI) operating at an ECC. An AI agent and/or LLMs may be operable to condition (e.g., format) the data into, for example, a payload that may be used to: deliver the data to another CAD system, populate a protocol tool/form integrated into the emergency management application, and/or perform CAD dispatch operations from the emergency management application.

18 Claims, 14 Drawing Sheets

Payload <u>302</u>

Incident Type: Fire
Date: June 4, 2025
City/State: Austin, GA
Sector: 23
Agency Requested: Fire
Comment: A 911 call was received reporting a
fire and smoke at 123 S Main street by a Trevor
Norton.

Payload <u>304</u>

```
{
  "incident_type": "Fire",
  "date": "June 4, 2025",
  "city_state": "Austin, GA",
  "sector": 23,
  "agency_requested": "Fire",
  "comment": "A 911 call was received reporting
a fire and smoke at 123 S Main street by a
Trevor Norton."
}
```

FIG. 3

PROCESS FOR PROVIDING ARTIFICIAL INTELLIGENCE (AI)-BASED COMPUTER AIDED DISPATCH (CAD) DATA CAPTURE AT AN EMERGENCY COMMUNICATION CENTER (ECC) 600

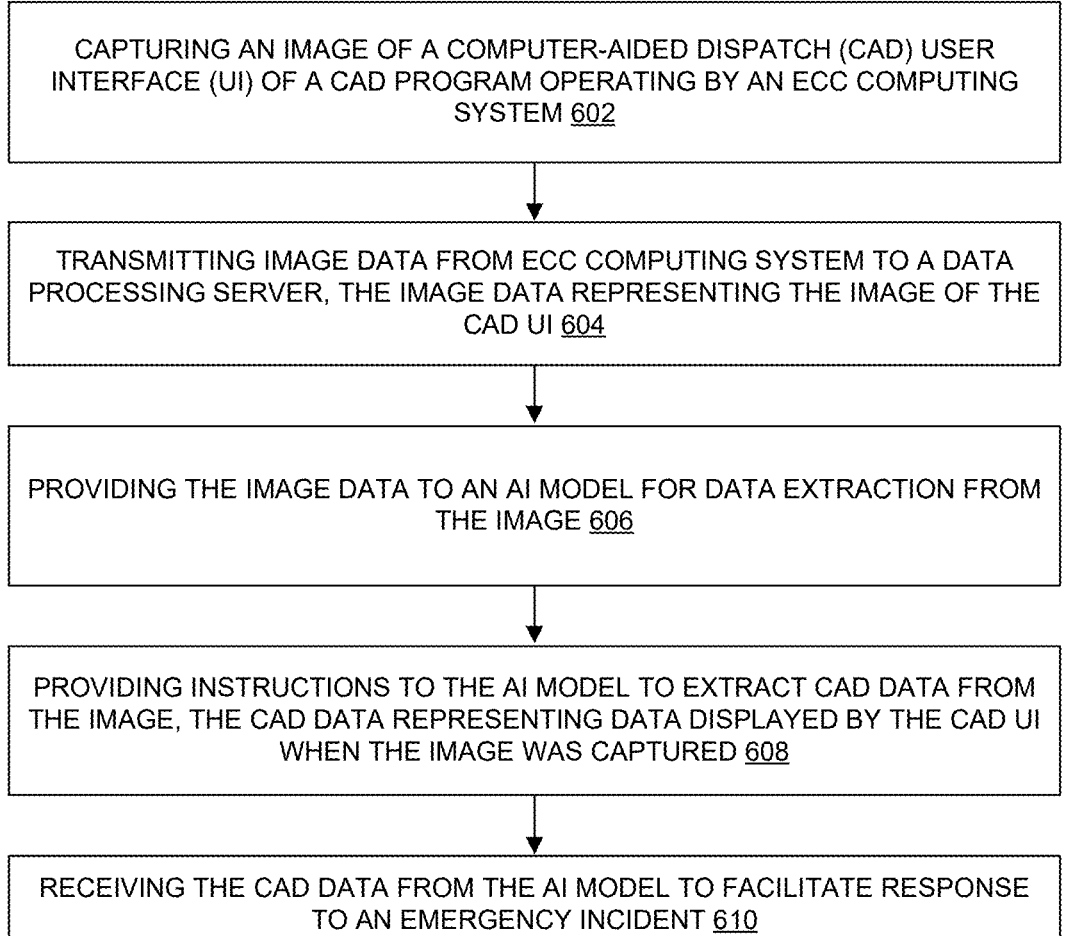

CAPTURING AN IMAGE OF A COMPUTER-AIDED DISPATCH (CAD) USER INTERFACE (UI) OF A CAD PROGRAM OPERATING BY AN ECC COMPUTING SYSTEM 602

TRANSMITTING IMAGE DATA FROM ECC COMPUTING SYSTEM TO A DATA PROCESSING SERVER, THE IMAGE DATA REPRESENTING THE IMAGE OF THE CAD UI 604

PROVIDING THE IMAGE DATA TO AN AI MODEL FOR DATA EXTRACTION FROM THE IMAGE 606

PROVIDING INSTRUCTIONS TO THE AI MODEL TO EXTRACT CAD DATA FROM THE IMAGE, THE CAD DATA REPRESENTING DATA DISPLAYED BY THE CAD UI WHEN THE IMAGE WAS CAPTURED 608

RECEIVING THE CAD DATA FROM THE AI MODEL TO FACILITATE RESPONSE TO AN EMERGENCY INCIDENT 610

FIG. 6

PROCESS FOR PROVIDING COMPUTER AIDED DISPATCH (CAD)-TO-CAD
INTEROPERABILITY USING ARTIFICIAL INTELLIGENCE (AI)-BASED CAD DATA
CAPTURE AT AN EMERGENCY COMMUNICATION CENTER (ECC) 700

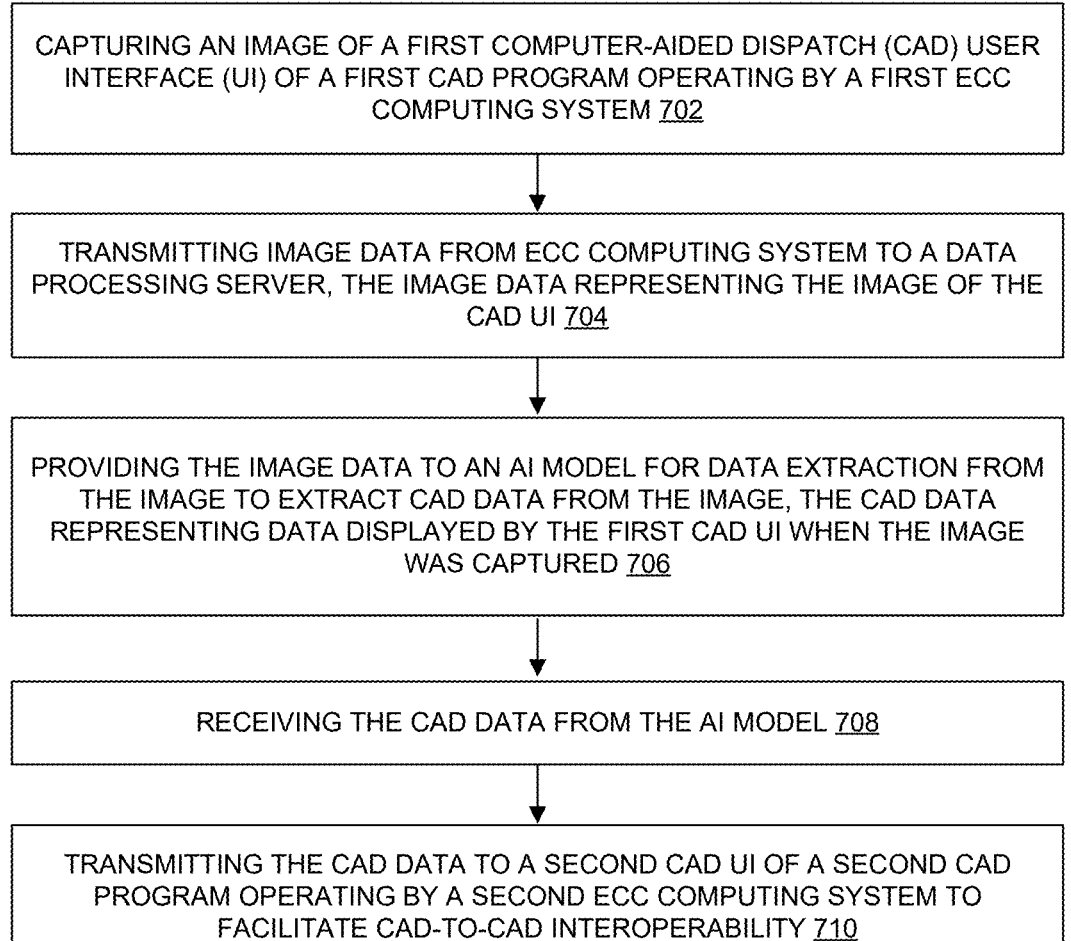

CAPTURING AN IMAGE OF A FIRST COMPUTER-AIDED DISPATCH (CAD) USER
INTERFACE (UI) OF A FIRST CAD PROGRAM OPERATING BY A FIRST ECC
COMPUTING SYSTEM 702

TRANSMITTING IMAGE DATA FROM ECC COMPUTING SYSTEM TO A DATA
PROCESSING SERVER, THE IMAGE DATA REPRESENTING THE IMAGE OF THE
CAD UI 704

PROVIDING THE IMAGE DATA TO AN AI MODEL FOR DATA EXTRACTION FROM
THE IMAGE TO EXTRACT CAD DATA FROM THE IMAGE, THE CAD DATA
REPRESENTING DATA DISPLAYED BY THE FIRST CAD UI WHEN THE IMAGE
WAS CAPTURED 706

RECEIVING THE CAD DATA FROM THE AI MODEL 708

TRANSMITTING THE CAD DATA TO A SECOND CAD UI OF A SECOND CAD
PROGRAM OPERATING BY A SECOND ECC COMPUTING SYSTEM TO
FACILITATE CAD-TO-CAD INTEROPERABILITY 710

FIG. 7

SYSTEMS AND METHODS FOR PROVIDING AN AI-BASED COMPUTER-AIDED DISPATCH (CAD) DATA INTERFACE AT AN EMERGENCY COMMUNICATION CENTER (ECC)

CROSS-REFERENCE TO RELATED APPLICATION

This application claims the benefit of U.S. Provisional Application No. 63/786,517, filed on Apr. 10, 2025, which application is incorporated herein by reference in its entirety.

TECHNICAL FIELD

This disclosure relates generally to emergency management systems, and in particular to interfacing with public safety interfaces/applications (e.g., computer-aided dispatch (CAD) systems).

BACKGROUND

In the critical moments following an emergency, rapid and accurate information dissemination is paramount for effective response. Emergency communication centers (ECCs), such as 911 call centers, serve as vital hubs for receiving initial reports and coordinating the dispatch of first responders. First responders, including firefighters, police officers, and emergency medical technicians, rely on timely and relevant information to navigate to the scene, assess the situation, and implement appropriate actions.

The ability of emergency personnel to quickly understand the nature of the emergency, the location, and any potential hazards significantly impacts response times and the safety of both the public and the responders. Traditional emergency response workflows often involve manual information gathering and dissemination, which can be time-consuming and prone to human error, particularly under the high-pressure conditions inherent in emergency situations.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 illustrates an example diagram of payload for CAD data, in accordance with aspects of the disclosure.

FIG. 6 illustrates an example flow diagram of processes for AI-based CAD data capture at an ECC, in accordance with embodiments of the disclosure.

FIG. 7 illustrates an example flow diagram of processes for providing CAD-to-CAD interoperability using AI-based CAD data capture at an ECC, in accordance with embodiments of the disclosure.

DETAILED DESCRIPTION

Figure 1A:
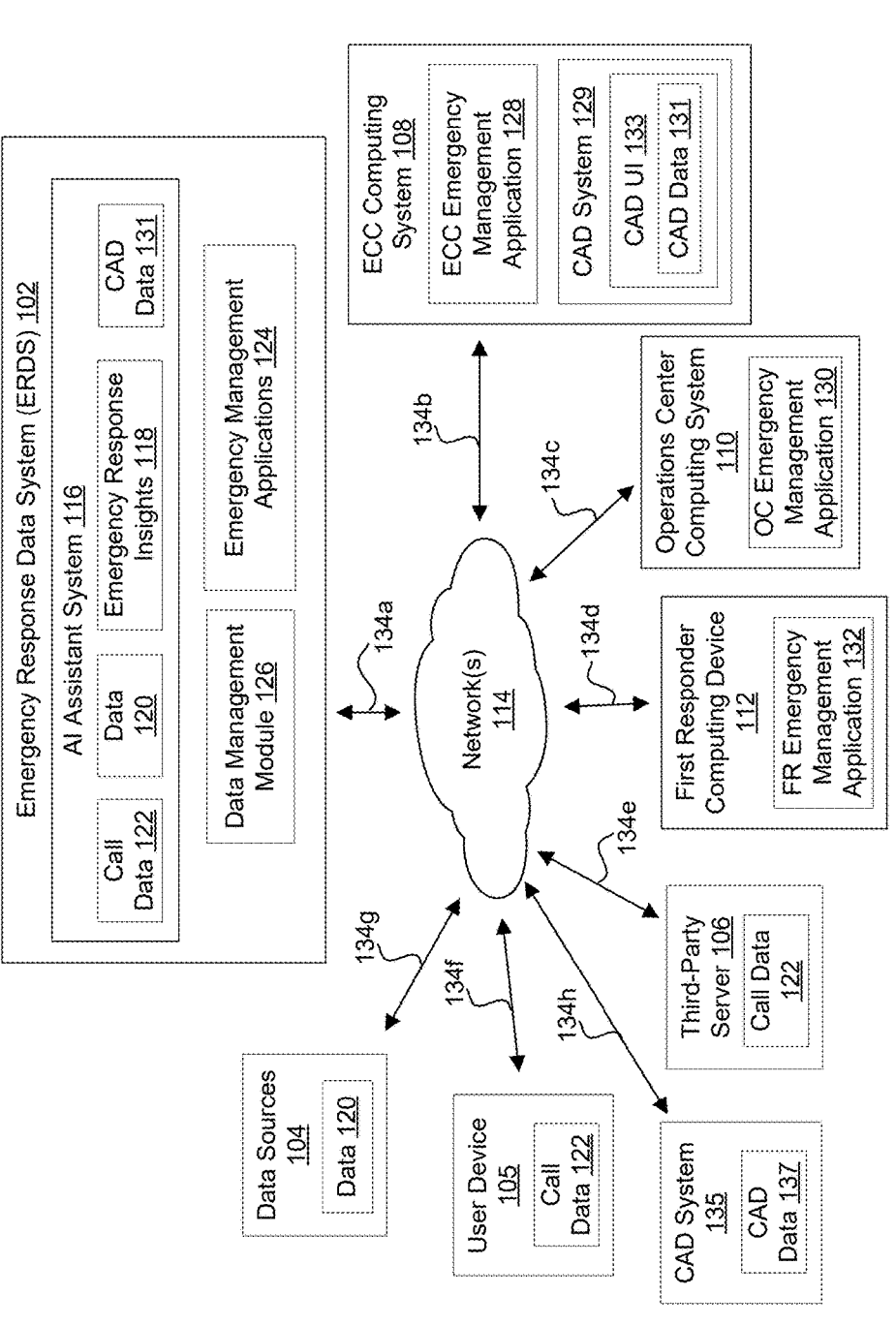
FIGS. 1A and 1B illustrate example diagrams of an emergency response system, in accordance with embodiments of the disclosure.

Various aspects of the disclosure include methods and systems for automating the display of emergency communication data in an emergency management user interface. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway network operations center (NOC), a primary call center, a secondary call center (e.g., that receives calls from or routes calls to a primary call center), and the like. A public emergency services agency may be referred to as an emergency service provider (ESP) or an emergency communications center (ECC). An ESP or ECC is one type of a public safety answering point (PSAP). A PSAP is essentially a call center where 911 calls are answered, and the calls are dispatched to emergency (first) responders in response to the emergency communications (e.g., calls, text, or video messages to 911).

Telecommunicators at an ECC take on the tremendous responsibility of being the intermediary between people in need and field responders. Telecommunicators can include call-takers and dispatchers. At some ECCs a dispatcher performs both roles. A call-taker is a person who answers a 911 call, and a dispatcher communicates (e.g., via radio and/or computer-aided dispatch) the location and other details of an emergency to field responders (e.g., emergency medical technicians, police officers, firefighters, etc.). Each click and keystroke adds delay and cognitive load, so the faster the telecommunicator can access caller information (e.g., location, health data, surrounding conditions, etc.) and determine the next steps that need to be taken, the more clearly the telecommunicator can identify and dispatch the appropriate field responders.

Embodiments of the disclosure include an emergency response system that is operable to provide artificial intelligence (AI)-based CAD to CAD interoperability and/or public safety software interfaces, in accordance with aspects of the disclosure. The emergency response system includes an emergency response data system (ERDS) that hosts emergency management applications that are operable at ECCs and on ECC computing systems. One or more client-side components and/or back-end components work together in concert with agentic AI (e.g., an AI agent, one or more large language models (LLMs), machine learning (ML), etc.) to extract CAD data from a screenshot or screen analysis of a CAD user interface (UI) operating at an ECC. An AI agent and/or LLMs may be operable to condition (e.g., format) the data into, for example, a payload that may be used to: deliver the data to another CAD system, populate an intake procedure integrated into the emergency management application, and/or perform CAD dispatch operations from the emergency management application, according to various embodiments of the disclosure.

Using application programming interfaces (API), an AI agent or computer use agent (CUA) may be configured to interface with a number of public safety interfaces. For example, the AI agent or CUA may used the disclosed techniques to extract data from, provide data to, and perform actions (e.g., dispatch emergency response resources) with the public safety interfaces, such as CAD systems, Next Generation 911 (NG911) systems, records management systems (RMS), geographic information systems (GIS), telephony/call handling systems, and/or the like. The interfaces may include, but are not limited to, proprietary vendor APIs (REST), SIP, ESInet, GIS service APIs, and API hooks, for example. As disclosed herein, the AI agent and/or CUA may interact with the public safety interfaces by providing keyboard controller and/or mouse controller commands to a local computing system and/or a networked computing system, for example.

The client-side components may include a web browser, a browser extension, and/or a client-side application, for example. In operation, a web browser may execute an instance of an emergency management application hosted by an emergency response data system. Another web browser may be operable to run a CAD program. The browser extension and/or client-side application may be configured to capture a screen shot of the UI of the CAD program and provide the screenshot to the ERDS for data extraction (e.g., using an AI agent), according to an embodiment. The emergency response application may be configured to message the browser extension and/or client-side application to trigger the capture based on detection of a new incident. The emergency response application and/or ERDS detect new incident by monitoring, for example, call data record (CDR) data, automatic number identification (ANI) data, and/or SIP data, for example. The web browser may use, for example, front end scripting languages (e.g., JavaScript) and browser extensions to provide information to a local run client-side application. In one embodiment, the client-side application may use one or more LLMs and/or artificial intelligence (AI) agents to determine and/or extract the CAD data from an image and/or screenshot of the CAD program.

The disclosed systems and methods transform the technological area of emergency response management. CAD programs use inconsistent fields, terms, payloads, and data types that are problematic for interoperability and transfer of information between agencies and/or other CAD programs. Furthermore, for security reasons, many CAD programs are locally installed and difficult to update, resulting in an inability to receive the benefit of the newest advances in technology (e.g., AI processes). For example, the disclosed emergency response system may advantageously lead to clearer insights into emergencies (through aggregation of disparate types of data), AI analysis of CAD data, transfer of CAD data to other CAD programs, transfer of CAD incidents to other agencies (e.g., ECCs), and enablement of cloud-based CAD operations. Various embodiments of the disclosure are described hereafter and represented in FIGS. 1A-12.

Figure 1B:
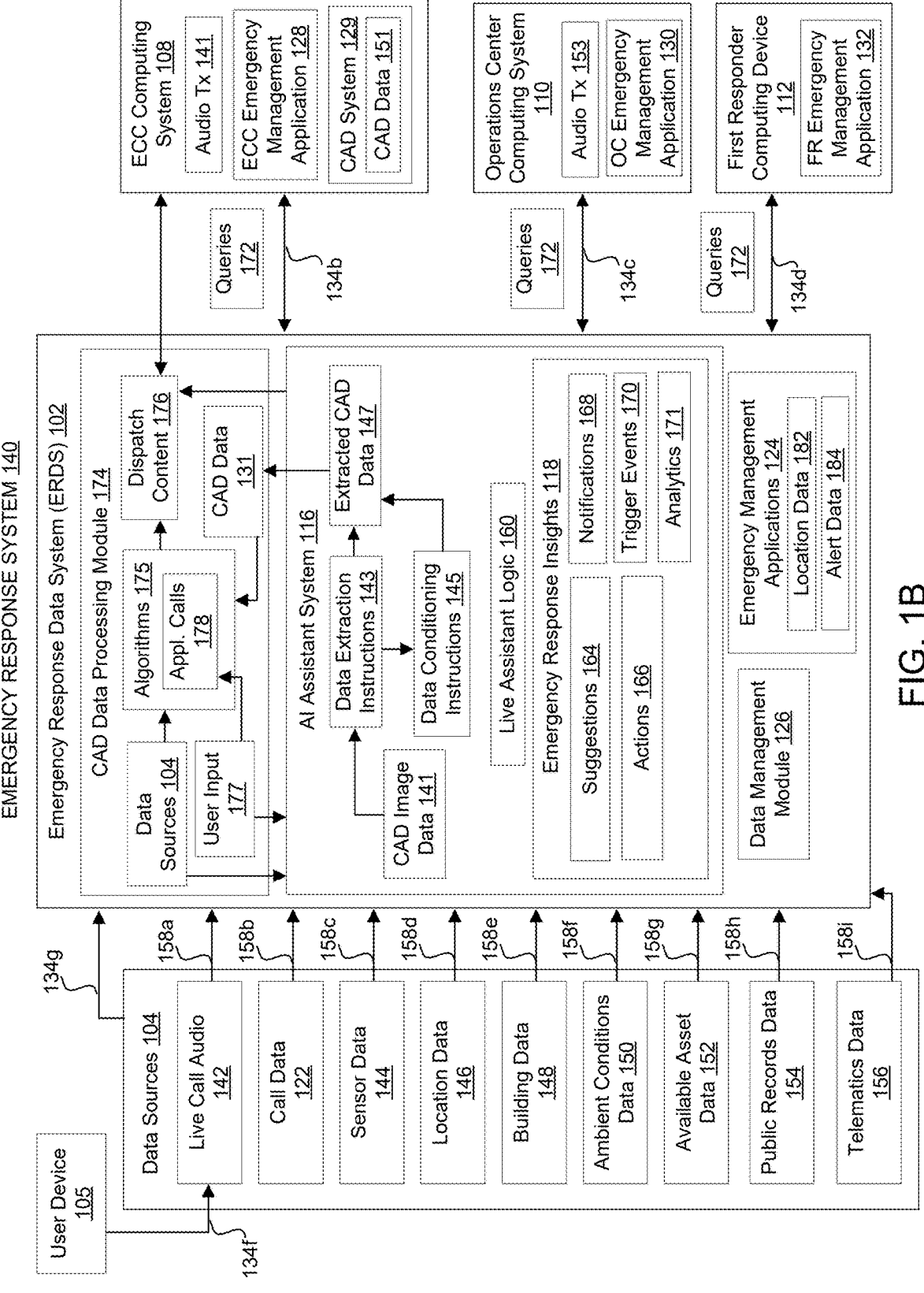

FIGS. 1A and 1B illustrate example embodiments of an emergency response system that is operable to provide artificial intelligence (AI)-based CAD interfacing (e.g., CAD to CAD interoperability), in accordance with aspects of the disclosure. FIG. 1A illustrates a diagram of an emergency response system 100 that includes an emergency response data system (ERDS) 102 that is communicatively coupled to a number of data sources 104, a user device 105, a third-party server 106, an ECC computing system 108, an operations center (OC) computing system 110, a first responder computing device 112, and/or a CAD system 135 through one or more networks 114, according to an embodiment. ERDS 102 is a data processing server, according to an embodiment. Networks 114 may include a number of wired networks, wireless networks, network components, and infrastructure. A number of communications channels 134 (individually, 134*a*, 134*b*, 134*c*, 134*d*, 134*e*, 134*f*, 134*g*, and 135*h*) may communicatively couple the various components of emergency response system 100.

Emergency response data system 102 includes an artificial intelligence (AI) assistant system 116 that is configured to generate and/or extract CAD data 151 from CAD system 129 operable on ECC computing system 108, according to an embodiment. AI assistant system 116 receives a screenshot or image of a CAD UI 133 of CAD system 129 and scrapes CAD data 151 from CAD UI 133 to extract/determine CAD data 151. CAD data 151 may then be used by ERDS 102 to distribute CAD data 151 to other CAD systems (e.g., CAD system 135), to provide CAD data 131 to emergency management applications 124, and/or to provide CAD data 151 to operations center computing system 110 (e.g., a GSOC) and/or a first responder computing device 112 (e.g., a fire fighter mobile device), for example.

Emergency response data system 102 is also operable to generate emergency response insights 118 from data 120 and call data 122, according to an embodiment. AI assistant system 116 is operable to determine characteristics of call data 122 and aggregate the characteristics with data 120, according to an embodiment. AI assistant system 116 is operable to analyze the aggregated characteristics with data 120 and/or CAD data 151 to generate emergency response insights 118, according to an embodiment. AI assistant system 116 and/or emergency response data system 102 may then provide emergency response insights 118 to ECC computing system 108, operations center computing system 110, and/or first responder computing device 112 for receipt by emergency responders and/or emergency management personnel.

Emergency response data system 102 is configured to host and/or support a number of emergency management applications 124 that are accessed by and/or operated by ECC computing system 108, operations center computing system 110, and/or first responder computing device 112, according to embodiments of the disclosure. Emergency response data system 102 may be implemented with one or more servers that may be distributed across multiple data centers. Emergency management applications 124 may be implemented on/in emergency response data system 102 as web-based applications that are accessed via a web browser, a webhook, a persistent webhook, and/or one or more secure connections. Emergency management applications 124 may be configured to process, push, and/or receive data to/from a mobile application or an operating system (OS) specific application that is downloaded to and operated by a particular computing system or device (e.g., a first responder smart phone). Data 120 and call data 122 may be retrieved, received, managed, and directed to AI assistant system 116 and/or emergency management applications 124 with a data management module 126 to support generating and delivering emergency response insights 118.

The various computing systems that receive emergency response insights 118 are tools that may be used by emergency response personnel and emergency responders to dispatch, communicate about, and respond to incidents and emergencies that are represented by or in data 120 and/or call data 122, according to an embodiment. ECC computing system 108 represents a computing system (e.g., a terminal, a server, a personal computer, a laptop, etc.) operated at or for an ECC. ECC computing system 108 is configured to operate or provide an ECC emergency management application 128. ECC emergency management application 128 may be communicatively coupled to emergency response data system 102 to receive emergency response insights 118, data 120, and/or call data 122. ECC emergency management application 128 may be configured with a graphical user interface to visually represent emergency events and incidents (e.g., using maps, queues, icons, data cards, etc.) and to enable emergency response personnel (e.g., 911 dispatchers, telecommunicators, etc.) to dispatch and communicate emergency events.

Operations center computing system 110 represents a computing system (e.g., a terminal, a server, a personal computer, a laptop, etc.) operated at or for an operations center (e.g., a global operations security center (GSOC), a rail network operations center (NOC), etc.). Operations center computing system 110 is configured to operate or provide/execute an operations center emergency management application 130. The operations center emergency management application 130 is an instance of emergency management applications 124 that provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises.

First responder computing device 112 is representative of computing systems, mobile devices, and/or in-vehicle devices used by emergency responders to navigate to, coordinate for, and communicate about emergency events and other incidents, according to an embodiment. The term "first responder" may be used interchangeably with the term "field responder," as used herein. First responder emergency management application 132 may be operated on or by first responder computing device 112. First responder emergency management application 132 is communicatively coupled to emergency response data system 102 to receive emergency response insights 118, data 120, and/or call data 122 to inform the preparation and response to emergency events, according to an embodiment.

User device 105 may include a telephone, a smart phone, tablet, a laptop, personal computer, a chrome book, or other computing devices that may be used, to initiate an emergency call (e.g., a 911 call) or to otherwise report an incident, according to an embodiment. Call data 122 represents audio data, video, data, images, multimedia messages, and/or text messages provided from user device 105 to ECC computing system 108 and/or operations center computing system 110, according to an embodiment.

Third-party server 106 may include a telecommunications or device manufacturer server that receives location data, user identification data, and/or call statistics for emergency calls made by user device 105. Third-party server 106 may be configured to provide call data 122 to emergency response data system 102 to support operation of emergency applications 124, according to an embodiment. Call data 122 may include device-based hybrid (DBH) data that may be provided by some telecommunications and/or smartphone companies.

CAD system 135 is representative of a CAD program that receives CAD data 151 as CAD data 137, which is an extracted, conditioned, and/or reformatted version of CAD data 151, according to an embodiment. Examples of CAD programs include locally installed (e.g., at an ECC) and cloud-based programs such as, PremierOne CAD, Enterprise CAD, CAD Pro, CentralSquare CAD, CAD Pro, Unify, Versaterm CAD, ZOLL Dispatch, and the like.

FIG. 1B illustrates an example block diagram of an emergency response system 140 that is operable to provide AI-based CAD to CAD interoperability, in accordance with aspects of the disclosure. Emergency response system 140 is an example implementation of emergency response system 100, in accordance with aspects of the disclosure.

Data sources 104 may include one or more of a number of data types and data sources that may be used to identify, characterize, analyze or otherwise gain insights about emergency events and other incidents, according to an embodiment. Examples of data sources 104 include, but are not limited to, live call audio 142, call data 122, sensor data 144, location data 146, building data 148, ambient conditions data 150, available asset data 152, public records data 154, and/or telematics data 156, according to an embodiment. Live call audio 142 may be received by emergency response data system 102 by configuring a call audio transmitter 153 to forward/provide live call audio 142 from ECC call handling equipment (e.g., from ECC computing system 108) and/or by configuring call audio transmitter 143 to forward/ provide live call audio 142 from GSOC/NOC call handling equipment (e.g., from operations center computing system 110), for example. Live call audio 142 may also include radio-based dispatches or transcripts of radio-based dispatches of emergencies from an ECC. Call data 122 may include call duration, caller name, repeat call statistics, etc. of a call to an ECC or operations center. Call data 122 may be at least partially retrieved from ECC computing systems and may include ANI (automatic number identification) data, ALI (automatic location identification) data, and/or CDR (call detail record) data. The ANI data is the phone number from which a 911 call or text to 911 originates. ALI data is the location information associated with the ANI data, and the ALI data may be retrieved from a database linked to the ANI data. CDR data is a detailed record of an incoming 911 call and may contain ANI data, the time the call came in, the time it was answered, any transfers, and the trunk number used. The position of a call-taker may also be included in the ANI data and/or the CDR data. Sensor data 144 may include, but is not limited to, data received or retrieved from residential buildings, commercial buildings, personal medical devices, personal safety devices, industrial structures, vehicles, crash detectors, smoke alarms, fire alarms, smart cameras, home security devices, moisture detectors, motion detectors, shock detectors, location sensors, gas detectors, pressure sensors, or the like, according to various embodiments of the disclosure. Location data 146 may include a location of a sensor or incident (e.g., taken from a GPS unit of a smartphone). Building data 148 may include construction materials, structure age, floorplans, renovation history, electrical schematics, HVAC layout, or the like. Ambient conditions data 150 may include weather data, weather forecasts, road conditions, wind speeds, visibility, cloud conditions, temperature, or the like. Available asset data 152 may include, but is not limited to, a number of available drones, a number of available medical devices (e.g., automated external defibrillator), a number of vehicles, a number of sprinklers in a building, or the like. Public records data 154 may include, but are not limited to, personal property records, arrest records, residential addresses, etc. Telematics data 156 may include various types of vehicle data, such as accelerometer data, gyroscope data, air bag sensors, vehicle log data, or the like. Additional miscellaneous data source or data types may include social media feeds, new feeds, geofence data, traffic feeds, visual impairment status, auditory impairment status, or the like. The various data sources 104 may be communicatively coupled to emergency response data system 102 through a number of communications channels 158 (individually, 158*a*, 158*b*, 158*c*, 158*d*, 158*e*, 158*f*, 158*g*, 158*h*, and 158*i*), according to embodiments of the disclosure.

AI assistant system 116 is operable to extract, condition, and/or format CAD data to support distribution, aggregation, and/or analysis of CAD data, in accordance with aspects of the disclosure. AI assistant system 116 is operable as an AI agent, according to an embodiment. AI assistant system 116 analyzes CAD image data 141 with one or more LLMs, AI models, and/or with machine learning. Analysis of CAD image data 141 may be based on data extraction instructions 143 that prompt AI tools (e.g., LLMs, AI agent, AI models, machine learning, etc.) to perform image analysis and/or image extraction of CAD data 151 to generate extracted CAD data 147, according to an embodiment. AI assistant system 116 may also include and execute data conditioning instructions 145 to arrange, order, confirm, and/or format extracted CAD data 147. In one embodiment, data extraction instructions 143 and/or data conditioning instructions 145 arrange extracted CAD data 147 into a payload (e.g., JSON, XML, etc.) that is deliverable by ERDS 102 and/or CAD data processing module 174 to other CAD systems, field responders, and/or emergency management applications 124, for example.

Data extraction instructions 143 and/or data conditioning instructions 145 may include AI-type prompts or instructions. An example image processing prompt may include instructions such as, "your role is an image analyzer; the image includes CAD data that relates to an incident that has been escalated to a 911 call center; extract information from the image, including data fields and data associated with the data fields; create key:value pairs of the data fields and data values." Additional representative instructions in a prompt may include instructions like, "cross-check and data values from the extraction against CDR data, SIP data, ANI data, ALI data, and/or any additional call data to ensure accuracy." Additional representative instructions in a prompt may include, "run the data extraction through at least two different LLMs or AI models; resolve data value inconsistencies using additional AI models, historical CAD data, historical ECC data, transcript archives from 911 calls to the ECC that is the source of the image," for example. Additional representative instructions in a prompt may include, "use the CAD template of key:value pairs and match the extracted CAD fields and CAD data to the CAD template; generate a JSON file of the key:value pairs," for example.

AI assistant system 116 may include a number of components to support generating emergency response insights 118 for display by one or more of ECC emergency management application 128, operations center emergency management application 130, and/or first responder emergency management application 132, according to an embodiment. AI assistant system 116 may include live assistant logic 160, which may include aspects of a retrieval, augmentation, generation (RAG) system, to generate emergency response insights 118 based on call data 122, data sources 104, and/or trigger events 170, in accordance with aspects of the disclosure.

Emergency response insights 118 may include suggestions 164, actions 166, and/or notifications 168 that are generated in response to one or more trigger events 170, according to an embodiment. Emergency response insights 118 may also include analytics 171 that represent emergency communications statistics handled by an ECC, an operations center, and/or a first responder computing device at a particular location, for a region, and/or for a state or country. Emergency response insights 118 may also include inferences (e.g., potential cause of an accident, potential health/mental/physical characteristics of an accident victim, etc.) about an emergency communication that may be derived based on LLM training and/or information contained within one or more data sources 104. Suggestions 164 may be displayed or transmitted to emergency applications 124 to provide summaries, suggested actions, additional awareness, or other insights to a dispatcher, telecommunicator, emergency management operator, or first responder, according to an embodiment. Suggestions 164 may include, but are not limited to, 911 dispatcher codes, responder location, arrival times, pre-arrival instructions for first responders, severity of an incident (e.g., a severity score), live updates to incidents (based on live audio analysis and/or sensor data), medical procedures, documentation (e.g., standard operating procedures), response coordination, incident, characterization, and/or response suggestions, in accordance with various embodiments of the disclosure. Suggestions 164 may also include AI generated search terms and/or search phrases that are based on historical context of a particular user, spatial context, and/or temporal context, for example. Suggestions 164 may also include suggested actions, such as show traffic layer, dispatch to a particular location, display video feed layer, provide estimated time of arrival (ETA) of first responders, or other selectable actions. Emergency response data system 102 may cause one or more suggestions 164 to be displayed on a user interface of ECC emergency management application 128, operations center emergency management application 130, and/or first responder emergency management application 132, according to various embodiments of the disclosure.

Actions 166 are examples of actions that AI assistant system 116 may, in coordination with emergency response data system 102, initiate to facilitate a response to an emergency event. Actions 166 may be at least partially performed on the client-side based on client-side emergency data processing that is at least partially supported by client-side resources, such as client-side local LLMs. Actions 166 may include, but are not limited to, transfer calls (e.g., to an ECC having jurisdictional authority for a call), triage multiple calls (e.g., group, associate, combine, or summarize), call a point of contact (e.g., at a business location of an incident), cluster a group of calls or communications that are related to the same incident, automatedly respond to dupli-cate calls/texts about an emergency, search for a phone number of a point of contact, communicate with air ambu-lance server to dispatch an air ambulance, dispatch field responders to a location, display and/or populate protocol forms (e.g., intake protocol, cardiac-arrest protocol, chest pain protocol, drowning protocol, skin burn protocol, etc.), and/or generate a group chat or a group video conference between people who are located near or who are responding to a particular incident, according to various implementa-tions of the disclosure. Actions 166 may also include actions to manipulate and/or navigate the UI of an ECC or GSOC emergency management application. For example, actions 166 may include enabling and displaying a particular layer, transmitting a digital request for resources (e.g., dispatching an air ambulance), requesting resources from an adjacent or nearby ECC, and/or sending emergency information to a computer aided dispatch (CAD) system.

Notifications 168 may include informational content or alerts derived from a combination of the trigger events 170, live call audio 142, or other data sources 104, in accordance with aspects of the disclosure. Notifications 168 may include displaying particular insights about one or more related incidents, information about changes to an incident (e.g., a change of location, nature of a fire, number of victims, etc.), available asset updates, or the like.

Trigger events 170 include events that may serve to initiate the aggregation of data sources 104, analysis of data sources 104, and/or the generation of emergency response insights 118, according to an embodiment. Examples of trigger events 170 may include, but are not limited to, a 911 call, a call to a rail NOC, a call to a GSOC, a text message to 911, a text message to a rail NOC, initiating a videocon-ference with 911, an activated alarm, a change in sensor data, a change in ambient condition data 150 (e.g., an abnormal increase or decrease in temperature or moisture in a space), detection of a vehicle accident, airbag deployment, receipt of a query 172 from ECC computing system 108, receipt of a query 172 from an operations center computing system 110, and/or receipt of a query from first responder computing device 112, according to embodiments of the disclosure. Trigger events 170 may also include telematics data associated with a vehicular accident or incident.

Analytics 171 include various metrics for communica-tions occurring at an ECC, a region of ECCs, a state of ECCs, one or more operations centers, and/or one or more other first responder devices or stations, in accordance with aspects of the disclosure. The metrics can cover areas such as call handling, resource management, and overall opera-tional efficiency. The metrics may also include call answer times, abandonment rates, average handling time, and call volume trends to ensure service levels are being met and identify potential bottlenecks in the system. The metrics may also include incident response times and resource allocation to gauge the efficiency of emergency response coordination. As disclosed herein, AI assistant system 116 may include one or more AI agents that may be configured to generate visualizations (e.g., charts, graphs, etc.) based on underlying context data, natural language questions, historical datasets, and/or forecasts.

Live assistant logic 160 includes instructions, scripts, and/or one or more processes that support operations of AI assistant system 116, according to an embodiment. For example, live assistant logic 160 may be configured to communicate with data management module 126 to receive data for processing. Live assistant logic 160 may be con-figured to provide extracted CAD data 147 and/or generated emergency response insights 118 to emergency management applications 124, for example. Live assistant logic 160 may include or provide various application programming inter-faces (API) to facilitate receipt of query 172, according to an embodiment. Live assistant logic 160 may include decision trees, flow diagrams, instructions, one or more AI agents, one or more large language models (LLMs), machine learn-ing algorithms, or other processes to support live (real-time) interactions with human operators (e.g., call-taker, dis-patcher, telecommunicator, operations center operator, first responder, etc.), according to an embodiment.

Live assistant logic 160 and/or AI assistant system 116 may be implemented using one or more of a variety of technologies. Live assistant logic 160 and/or AI assistant system 116 may be a service that emergency response data system 102 communicates with remotely or may include a number of libraries and software packages installed onto one or more local or distributed server (e.g., cloud) systems. Live assistant logic 160 and/or AI assistant system 116 may be at least partially distributed to a client-side emergency data processing system using, for example, a browser exten-sion, a client-side application, a local LLM, a client-side operating system-based LLM, and/or a client-side net-worked LLM. Live assistant logic 160 and/or AI assistant system 116 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pretrained transformer): a generative model for text-based tasks; and ResNet: a pre-trained deep learning model commonly used for image classification. Live assistant logic 160 and/or AI assistant system 116 may incorporate other types of models, such as deep learning models, unsupervised models, gen-erative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

Live assistant logic 160 and/or AI assistant system 116 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pretrained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, Ope-nAI Codex, ERNIE (Enhanced Representation through Knowledge Integration), and/or Grok. In one embodiment, an LLM is trained on historical emergency response data (e.g., 911 call audio, emergency call audio, non-emergency call audio, sensor data, traffic data, weather data, field responder locations, telematics data, public records data, etc.), is operable to support ERDS 102 operations, and is offered for download as a local LLM to ECC computing system 108 and/or operations center computing system 110.

Live assistant logic 160 and/or AI assistant system 116 may be at least partially implemented on a computing system that is local to the ECC to reduce latency in data transmission between an ECC and remote data processing servers. For example, live assistant logic 160 and/or a RAG system may be implemented using a local LLM, allowing: CAD data extraction, live call audio and historical ECC data to be received from call handling equipment; on-premises data processing (e.g., image data, audio data, etc.); and low-latency re-insertion of information into the call handling equipment or to an ECC terminal. In accordance with various embodiments of the disclosure, a local implementation of live assistant logic 160 may include installation in an edge device coupled to an ECC or GSOC network, installation of a local LLM, installation of a local application, and/or local installation of a browser extension that communicates with the local application and/or local LLM, for example.

Emergency management applications 124 may provide location data 182 and alert data 184, in addition to emergency response insights 118, according to an embodiment. Location data 182 may include a device-based hybrid (DBH) location of an emergency event. The device-based hybrid location may be derived from call data 122 and/or may be received from third-party server 106. The device-based hybrid location may be based on GPS location of user device 105 or based on registered locations of electronic devices in the vicinity of and communicatively coupled to user device 105, according to various embodiments. Alert data 184 may include alerts or notifications that are based on sensor data 144 and/or one or more additional data sources 104, according to an embodiment. Location data 182 and/or alert data 184 may be provided to and/or displayed by one or more of the emergency management applications 128, 130, and/or 132, according to various embodiments.

Emergency response data system 102 and AI assistant system 116 may be configured to be responsive to queries 172 that may be entered into and received (from users) through any one of emergency management applications 128, 130, and/or 132. Emergency response data system 102 and AI assistant system 116 are configured to be responsive to queries 172 in the absence of a call-based trigger and/or a data-based trigger, according to an embodiment. Emergency management applications 128, 130, and/or 132 may include a query input text box, may perform audio to text, or may receive and transmit audio to provide queries 172 to AI assistant system 116. AI assistant system 116 may use queries 172 as a trigger event 170. AI assistant system 116 may convert queries 172 into a semantic vector to perform a vector search of a vector database, a content search of a vector database, and/or a hybrid vector-content search of a vector database. Queries 172 may include queries related to summaries, graphs, charts, or other visualizations of analytics for an ECC, operations center, and/or first responder device/station, according to an embodiment. AI assistant system 116 may provide responses to queries 172 as emergency response insights 118 and using similar UI elements in graphical user interfaces of emergency management applications 128, 130, and/or 132.

ERDS 102 includes a CAD data processing module 174 that is operable to support providing CAD to CAD interoperability, CAD data distribution, and/or augmentation of dispatch content 176, in accordance with aspects of the disclosure. CAD data processing module 174 is operable to receive or capture CAD image data 141 from CAD system 129, provide CAD image data 141 AI assistant system 116, receive extracted CAD data 147 as CAD data 151, use one or more algorithms 175 to aggregate/process/analyze CAD data 151, and/or selectively distribute CAD data 151, according to an embodiment. For example, CAD data 151 may be integrated into pre-populating protocol forms, may be used to cross-check other emergency data, may be displayed in an emergency management application at another ECC, and/or may be transmitted to another CAD program to enable CAD to CAD interoperability.

Algorithms 175 may include decision trees, processes, methods, LLMs, and/or AI systems to generate dispatch content 176, process CAD data 151, and/or aggregate CAD data 151 with data from data sources 104. Algorithms 175 may be configured to cause the display one or more data cards having caller information. The caller information that is displayed may be automatically displayed for a particular phone number that a call-taker answers to respond to a 911 call. The caller information may include information such as location data 146 that is representative of a location of a 911 call or a text to 911, which may be received from a third-party server 106 (e.g., a telecommunications server), in accordance with aspects of the disclosure. The caller information may also include health information, name, weather information, caller history, first responder ETA, special standard operating procedures/instructions, or additional insights inferred from data sources 104, for example. Upon receipt of additional data sources 104 and/or user input 177, algorithms 175 may be configured to generate dispatch content 176 (e.g., application calls 178, data cards, particular workflows, display of emergency response insights 118, etc.) that may be transmitted to and/or displayed by ECC emergency management application 128 and/or operations center emergency management application 130, in accordance with various aspects of the disclosure. Various client-side components may be configured to interact with emergency management applications 124 at the client using, for example, browser extensions, local applications, local LLMs, OS-based LLMs, and/or locally networked LLMs, to capture images or screenshots of CAD UIs and CAD data, according to embodiments.

Figure 2:
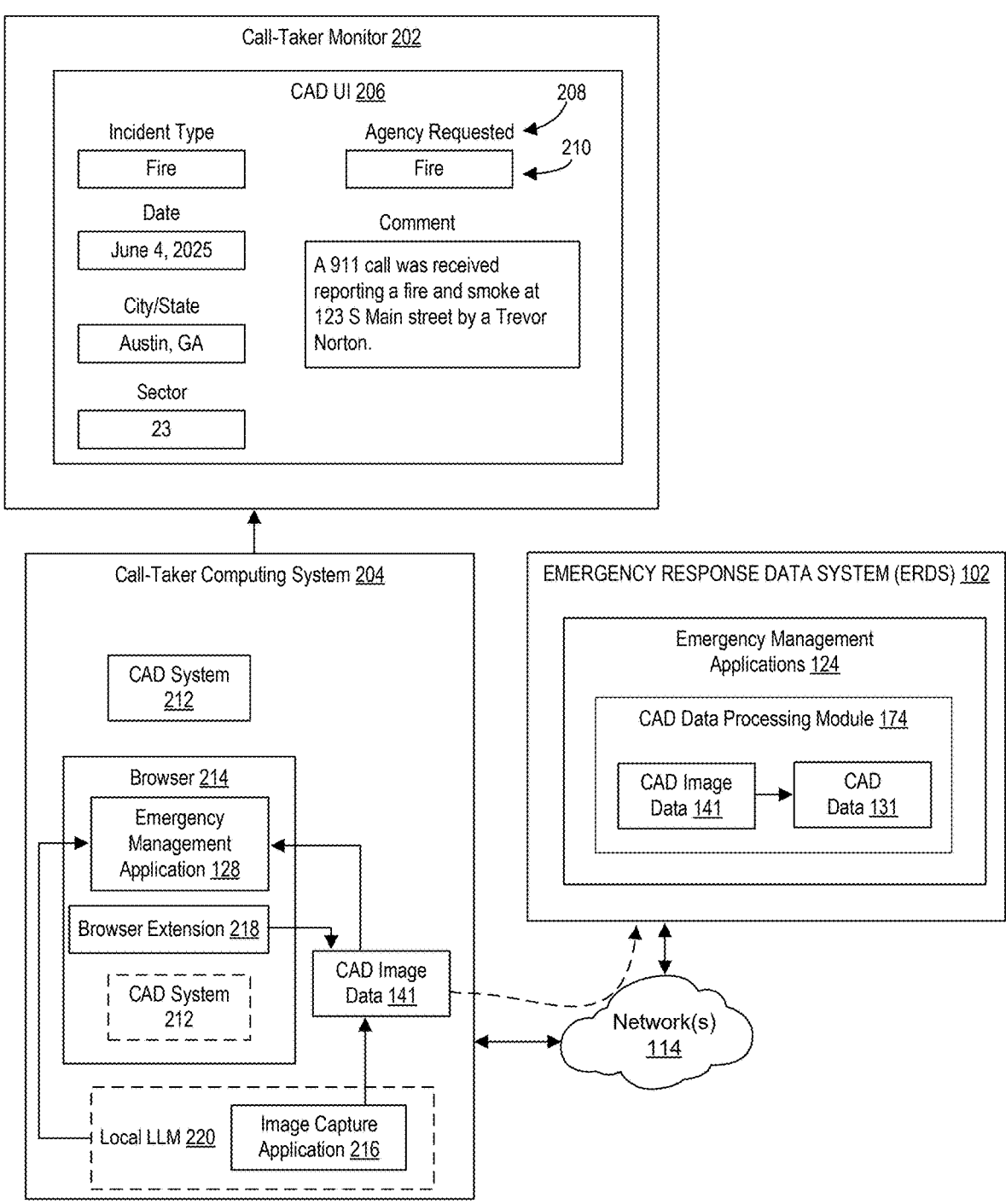
FIG. 2 illustrates an example diagram of an emergency response system operable for artificial intelligence (AI)-based computer-aided dispatch (CAD) data processing, in accordance with embodiments of the disclosure.

FIG. 2 illustrates a diagram of emergency response system 200, in accordance with aspects of the disclosure. Emergency response system 200 is an example implementation of emergency response system 100 and/or 140, according to an embodiment. Emergency response system 200 includes embodiments of the disclosure related to acquiring information from a CAD system, for example, if the CAD system is run on the same call-taker computing system as the emergency management system (e.g., emergency management system 124). Emergency response system 200 includes a call-taker monitor 202, a call-taker computing system 204, and ERDS 102, according to an embodiment.

Call taker monitor 202 displays a CAD UI 206 that is representative of the UI that may be provided by any one of a number of CAD systems, according to an embodiment. CAD UI 206 includes a number of fields 208 and a number of values 210, for example. Example fields include, but are not limited to, incident type, date, city, state, sector, agency requested, comments, and the like. It is to be understood that many more fields and values may be included in CAD UI 206.

Call taker computing system 204 includes a CAD system 212, a browser 214, and an image capture application 216, according to an embodiment. CAD system 212 may be a locally installed program on call taker computing system 204, or may be remotely accessed via browser 214, in accordance with various implementations. Browser 214 executes emergency management application 124, which may be displayed on call taker monitor 202.

Browser extension 218 may be downloaded or installed on call taker computing system 204 and may be operable to capture an image of CAD UI 206, according to an embodiment. Browser extension 218 may be triggered to capture an image based on detection of a new incident through, for example, emergency management application 124, according to an embodiment. Browser extension logic of browser extension 218 may be operable to enable communication between browser 214 and image capture application 216. Browser extension 218 may be downloaded (e.g., from an online storefront) and that may be operable to configure permissions and other characteristics of browser 214. Browser extension 218 may include a browser manifest that defines local file and application access (e.g., nativeMessaging permissions) to call-taker computing system 204. The browser manifest may include a local/absolute path to image capture application 216, a description of the application, an identifier of the application, and/or a list of extensions that are permitted to connect to the application (e.g., with the application is configured as a native messaging host).

To communicate information/instructions to image capture application 216, browser extension 218 may perform a number of operations. For example, browser extension 218 may call a Native Messaging API function (e.g., connect-Native(host_name)) to establish a persistent connection, which may launch the native host process for application 216 if not already running. Browser extension 218 may then send messages to the native host process for application 216 using, for example, sendNativeMessage call. Browser 214 may verify that browser extension 218 has adequate permissions (e.g., nativeMessaging permissions) and then may pass the browser extension messages to the native host (e.g., application 216 and/or call-taker computing system 204). Once the native host (e.g., application 216) is running, browser 214 and the native host may communicate by exchanging JSON messages via stdin and stdout calls. The native host may read messages from stdin, process the message, perform requested actions, and write a response (e.g., browser messages) using stdout.

Image capture application 216 may be downloaded or installed onto call taker competing system 204 and may be operable to image of CAD UI 206 and/or a screenshot of call taker monitor 202, according to an embodiment. Image capture application 216 and/or browser extension 218 may be operable to generate CAD image data 141 based on the image capture of CAD UI 206.

Image capture application 216 is a native messaging host, according to an embodiment. Image capture application 216 is a native messaging host that is implemented as an executable file as a Python script, a shell script, or an otherwise compiled executable file that is compatible with the operating system of call-taker computing system 204, for example. Image capture application 216 may include application logic that are instructions for operations performed by Image capture application 216. Application logic may include browser messages and LLM requests, for example. Browser messages include instructions and/or information to be provided back to browser operation logic to cause browser 214 to receive and/or send captured image data, according to an embodiment.

Browser extension 218 and/or image capture application 216 may be operable to provide CAD image data 141 to emergency management application 124 for delivery to ERDS 102, according to one embodiment. Browser extension 218 and/or image capture application 216 may be operable to directly deliver CAD image data 141 to ERDS 102 via, for example, networks 114, according to one embodiment. As disclosed herein, emergency ERDS 102 and/or CAD data processing module 174 may be configured to convert CAD image data 141 into CAD data 151.

Call taker computing system 204 may optionally include a local LLM 220 that is utilized by image capture application 216 to perform on-premises AI data extraction of from CAD image data 141, according to an embodiment. Local LLM 220 may be implemented as an AI agent that performs image capture operations, and image capture application 216 may be a subset of functions performed by local LLM 220, in accordance with aspects of the disclosure. A UI of the emergency management application 124 may have a button or other UI element that instructs local LLM 220 to perform image capture operations of CAD UI 206. LLM 220 may include operational instructions that cause LLM 220 to automatedly capture (e.g., screenshot) CAD image data 141 and/or generate CAD data 131, according to an embodiment.

FIG. 3 illustrates a diagram of CAD data 300, according to an embodiment. CAD data 300 may include a payload 302 and/or a payload 304. Payload 302 is a formatting of CAD data 151 into key: value pairs. Payload 304 is a formatting of CAD data 151 into a JSON format, in accordance with aspects of the disclosure.

Figure 4:
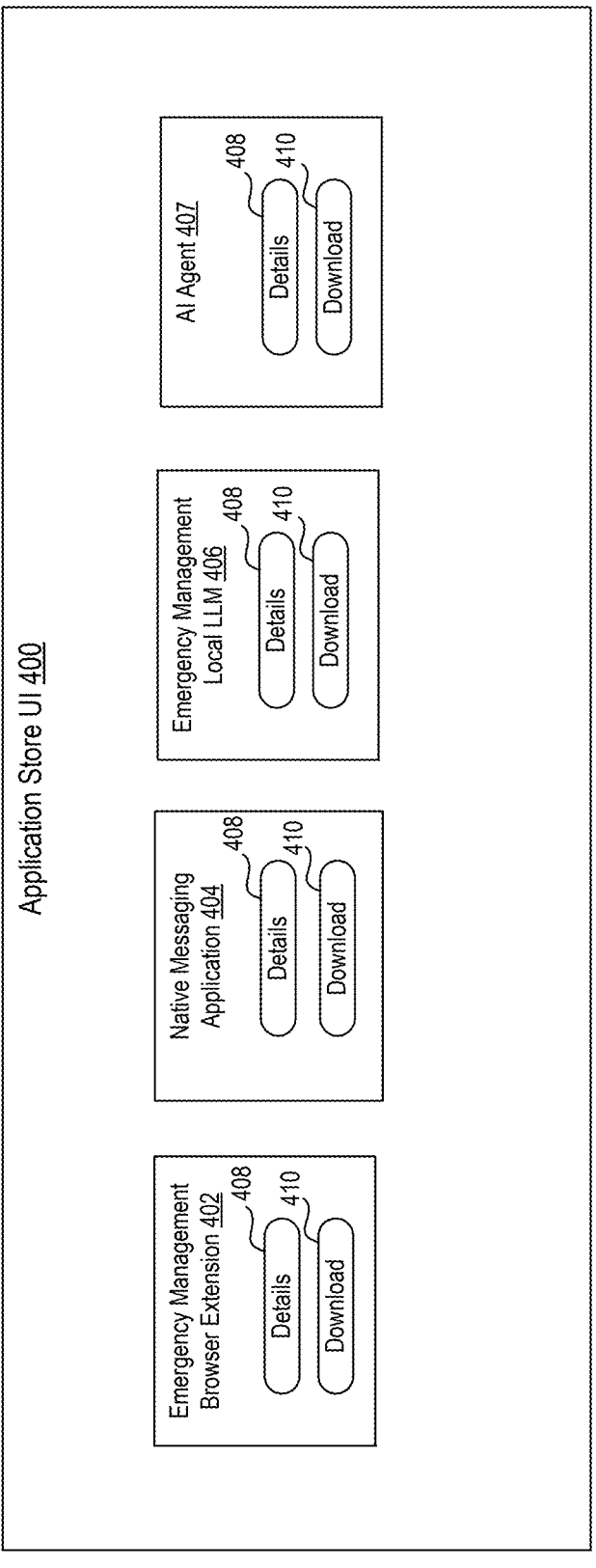
FIG. 4 illustrates an example diagram of an application store, in accordance with aspects of the disclosure.

FIG. 4 illustrates a diagram of an application store UI 400, in accordance with aspects of the disclosure. Application store UI 400 is representative of online stores provided by browser providers (e.g., Chrome, Bing, Firefox, etc.) and/or operating system companies (e.g., Microsoft) to facilitate secure transfer and distribution of software assets. Application store UI 400 includes emergency management browser extension 402, messaging host application 404 (e.g., image capture application), emergency management LLM 406 (e.g., local LLM), and/or an AI agent 407, according to an embodiment. Each asset may include a details button 408 that enables display of an asset description and includes a download button 410 that enables download of a particular asset to a local client to support CAD UI image capture, according to embodiments of the disclosure.

Figure 5A:
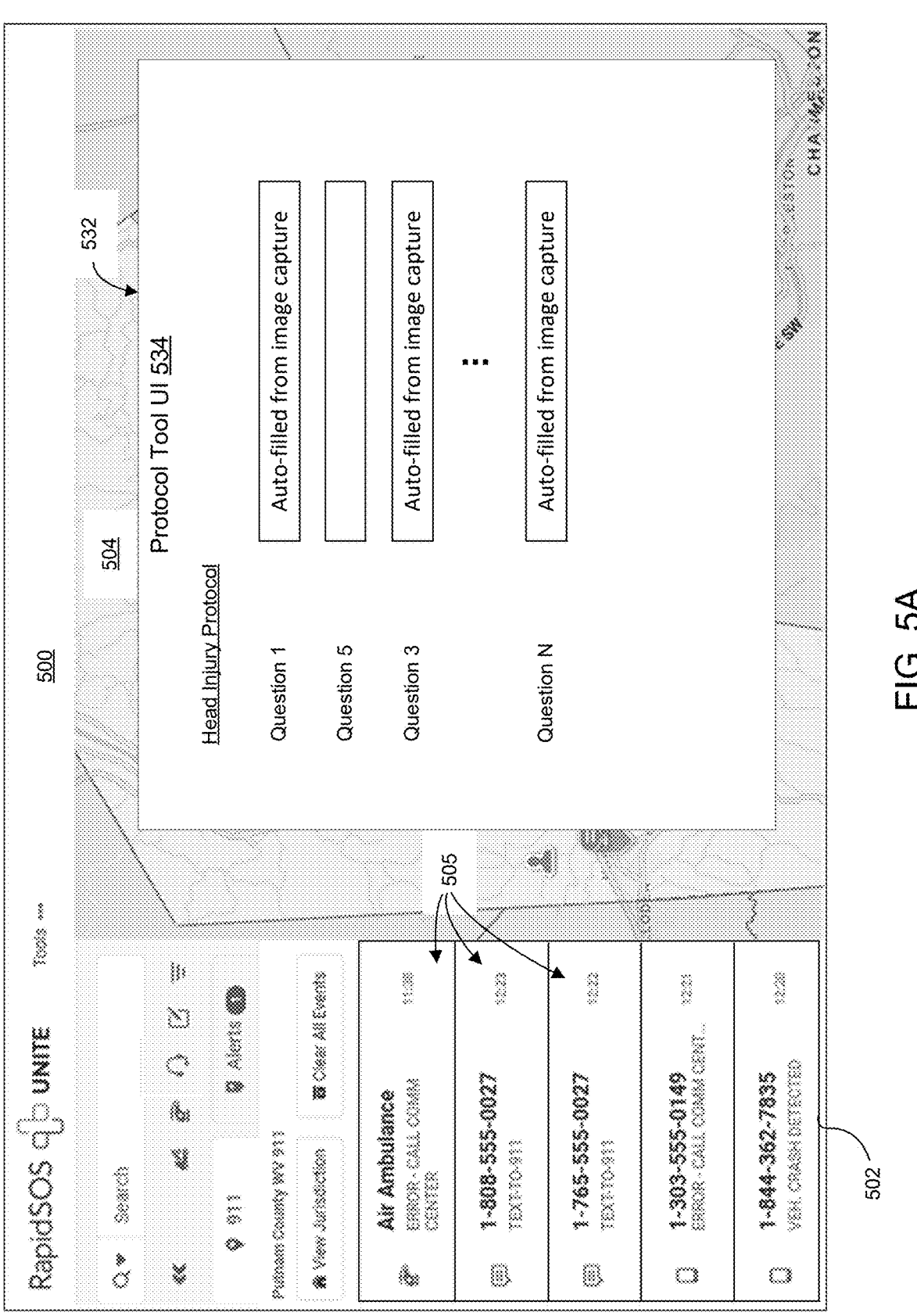
FIGS. 5A and 5B illustrate example diagrams of user interfaces populated from CAD data, in accordance with aspects of the disclosure.
Figure 5B:
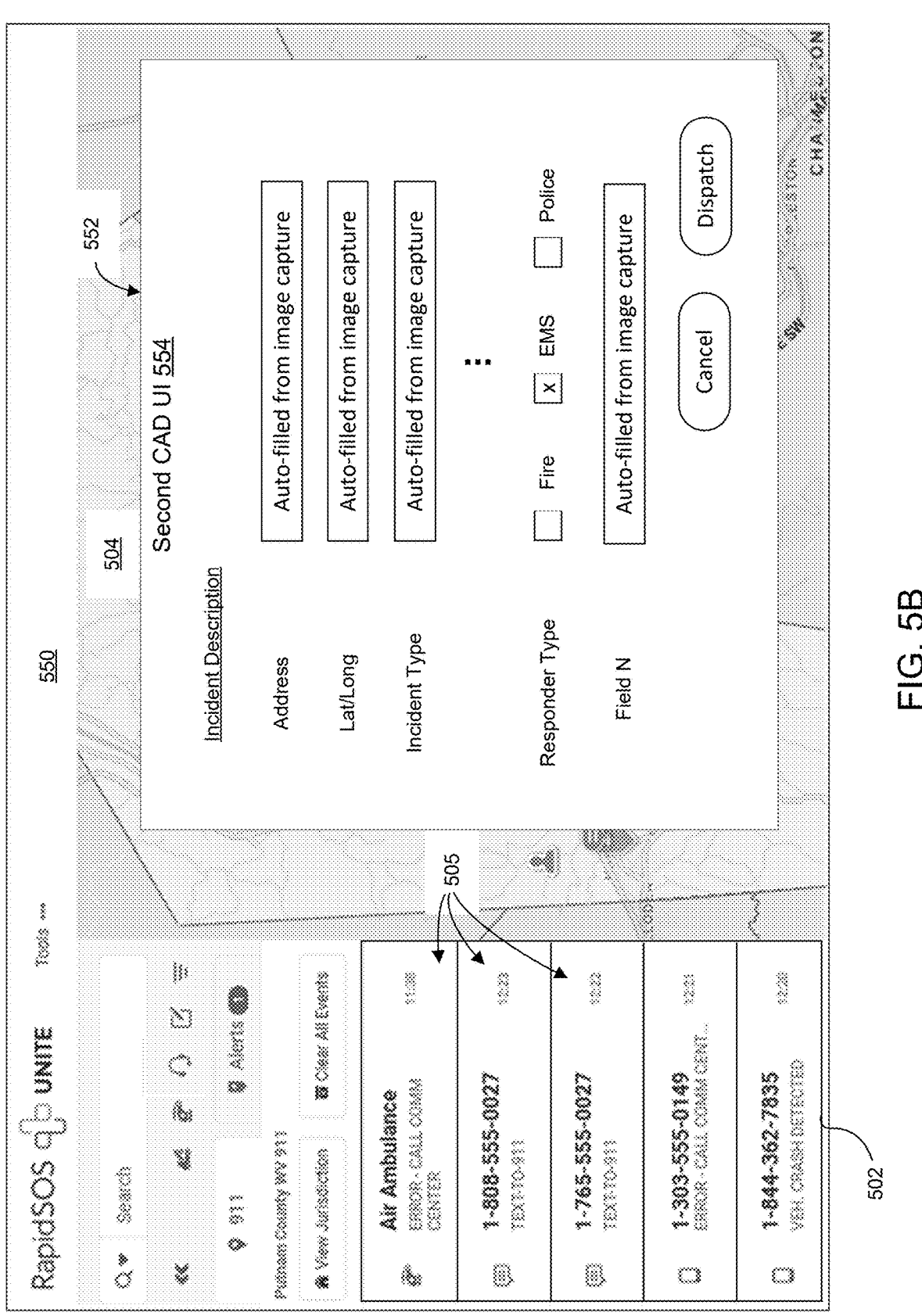

FIGS. 5A and 5B illustrate example diagrams of user interfaces populated from CAD data, in accordance with aspects of the disclosure. The CAD data may be captured from a CAD system, in accordance with various embodiments of the disclosure. The CAD data may be extracted from an image of a CAD system UI (e.g., a CAD UI).

FIG. 5A illustrates a diagram of an emergency management UI 500, according to an embodiment. Emergency management UI 500 includes an incident queue 502 that displays a number of incidents 505. Emergency management UI 500 includes a map 504 that displays locations pins associated with each of the incidents 505. Emergency management UI 500 includes a protocol tool 532 that is integrated into the emergency management application for facilitating a structured intake of a 911 call. The protocol tool 532 may be displayed as a protocol tool UI 534 (e.g., the UI of an intake protocol or other protocol for a particular type of emergency) that includes a number of fields or data labels that may be auto-filled with CAD data 151 based on the capture image of a CAD UI, as an example.

FIG. 5B illustrates a diagram of an emergency management UI 550 that depicts a CAD system 552 as a second CAD UI 554, according to an embodiment. Second CAD UI 554 may be populated with CAD data 151 that is captured from a first/different CAD UI from, for example, a separate CAD system. First CAD UI may be operated at a first ECC at a first location, and second CAD UI may be operated at a second ECC at a second location. Accordingly, embodiments of the disclosure may enable CAD-to-CAD data transfers to enable CAD-to-CAD interoperability.

FIG. 6 illustrates a flow diagram of a process 600 for providing artificial intelligence (AI)-based CAD data capture at an emergency communication center (ECC), in accordance with aspects of the disclosure. Process 600 may be implemented by one or more aspects of disclosed emergency response systems and/or emergency response data systems. Process 600 includes a number of operations; it is to be understood that one or more of the operations may be performed out of the described order and/or in parallel with other operations.

At operation 602, process 600 includes capturing an image of a computer-aided dispatch (CAD) user interface (UI) of a CAD program operating by an ECC computing system, according to an embodiment.

At operation 604, process 600 includes transmitting image data from ECC computing system to a data processing server, the image data representing the image of the CAD UI, according to an embodiment.

At operation 606, process 600 includes providing the image data to an AI model for data extraction from the image, according to an embodiment.

At operation 608, process 600 includes providing instructions to the AI model to extract CAD data from the image, the CAD data representing data displayed by the CAD UI when the image was captured, based on the incident data, according to an embodiment.

At operation 610, process 600 includes receiving the CAD data from the AI model to facilitate response to an emergency incident, according to an embodiment.

FIG. 7 illustrates a flow diagram of a process 700 for providing computer aided dispatch (CAD)-to-CAD interoperability using artificial intelligence (AI)-based CAD data capture at an emergency communication center (ECC), in accordance with aspects of the disclosure. Process 700 may be implemented by one or more aspects of disclosed emergency response systems or emergency response data systems. Process 700 includes a number of operations. It is to be understood that one or more of the operations may be performed out of the described order and/or in parallel with other operations.

At operation 702, process 700 includes capturing an image of a first computer-aided dispatch (CAD) user interface (UI) of a first CAD program operating by a first ECC computing system, according to an embodiment.

At operation 704, process 700 includes transmitting image data from ECC computing system to a data processing server, the image data representing the image of the CAD UI, according to an embodiment.

At operation 706, process 700 includes providing the image data to an AI model for data extraction from the image to extract CAD data from the image, the CAD data representing data displayed by the first CAD UI when the image was captured, according to an embodiment.

At operation 708, process 700 includes receiving the CAD data from the AI model, according to an embodiment.

At operation 710, process 700 includes transmitting the CAD data to a second CAD UI of a second CAD program operating by a second ECC computing system to facilitate CAD-to-CAD interoperability, according to an embodiment.

Figure 8:
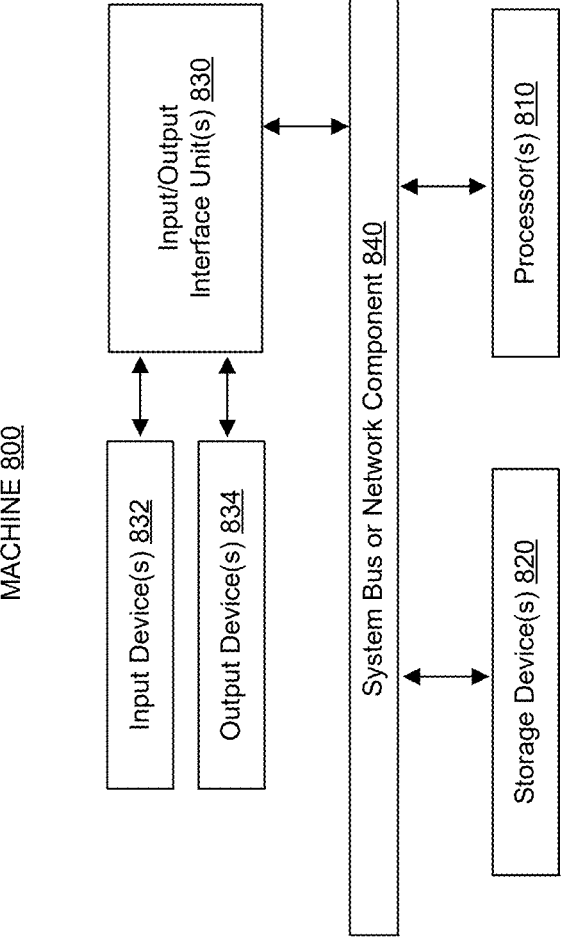
FIG. 8 illustrates an example diagram of a machine, in accordance with embodiments of the disclosure

FIG. 8 is a high-level block diagram of a machine 800 that may be used to implement one or more of the operations, devices, and/or systems disclosed herein. Machine 800 includes one or more processors 810, one or more input/output interface units 830, one or more storage devices 820, and one or more system buses and/or network components 840 for facilitating the communication of information among the coupled elements. One or more input devices 832 and one or more output devices 834 may be communicatively coupled to the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to affect one or more aspects of the present disclosure. At least a portion of the machine executable instructions may be stored (temporarily or more permanently) on the one or more storage devices 820 (e.g., non-transitory computer-readable medium) and/or may be received from an external source via one or more input interface unit 830.

In one embodiment, machine 800 may be one or more conventional personal computers, servers, distributed computing systems, augmented reality devices, virtual reality devices, wearable systems, and/or computing devices. The processors 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, an image sensor, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface.

Figure 9:
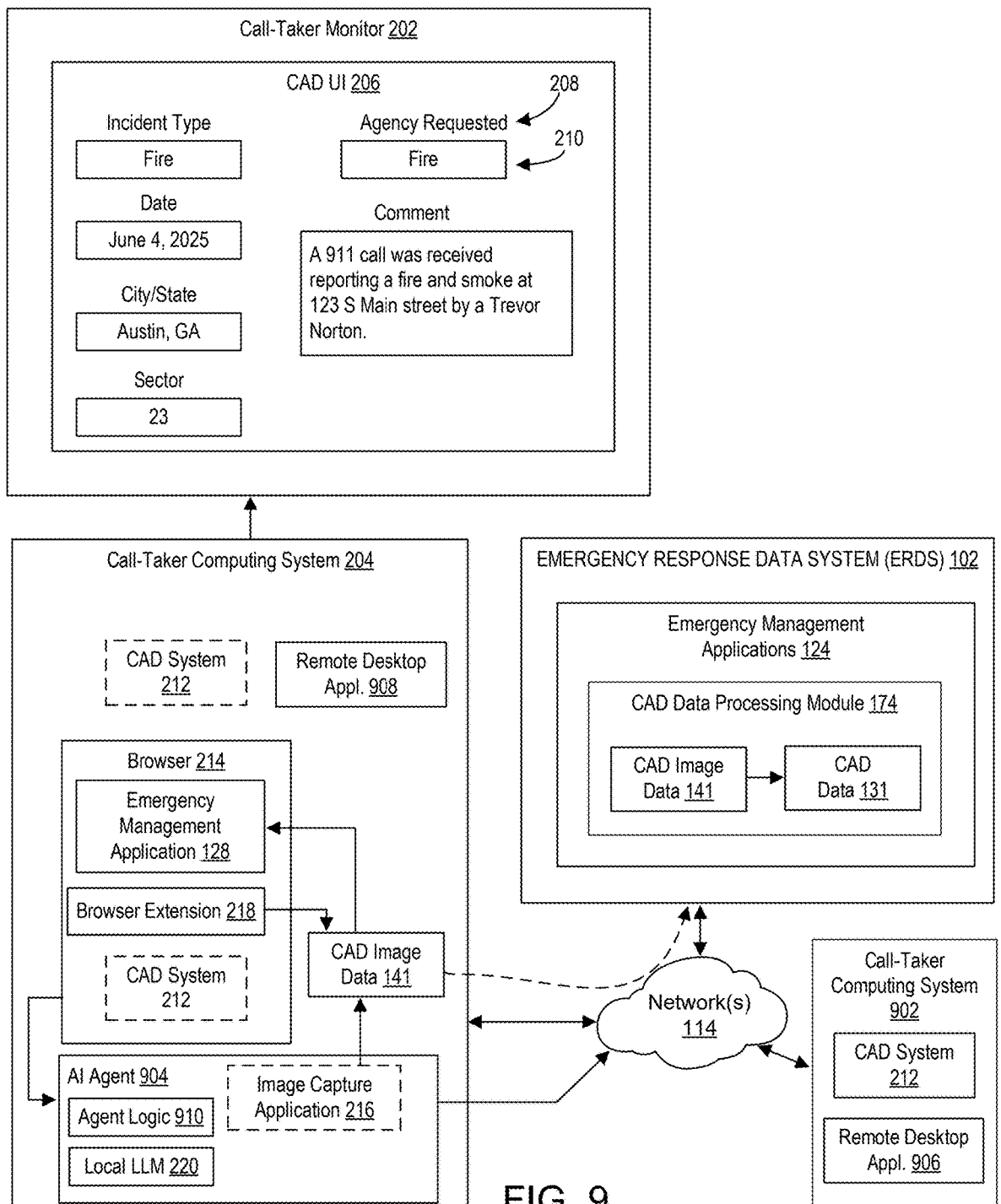
FIG. 9 illustrates an example diagram of an emergency response system, in accordance with embodiments of the disclosure.

FIG. 9 illustrates a diagram of emergency response system 900, in accordance with aspects of the disclosure. Emergency response system 900 is an example implementation of emergency response system 100 and/or 140, according to an embodiment. Emergency response system 900 includes embodiments of the disclosure related to acquiring information from a CAD system that is run on a different call-taker computing system than the emergency management system (e.g., emergency management system 124). Emergency response system 900 includes a call-taker computing system 902 and an AI agent 904, according to an embodiment.

In some ECCs, CAD system 212 may be operated by a call-taker computing system 205 that is independent from and communicatively coupled to call-taker computing system 204. Call-taker computing system 205 may be communicatively coupled to call-taker computing system 204 (e.g., through network(s) 114). Call-taker computing system 204 may be Internet-accessible while call-taker computing system 205 may be blocked from Internet access. Call-taker computing system 204 may operate a remote desktop application 908 that enables display of CAD system 212 within call-taker monitor 202 and enables the capture of CAD image data 141 from call-taker computing system 204, according to one embodiment. Call-taker computing system 902 may operable a remote desktop application 906 that supports remote access by call-taker computing system 204.

Remote desktop applications 904 and/or 906 may include built-in remote desktop functionality of, for example, the Windows® Operating System. In some embodiments, remote desktop applications 904 and/or 906 are applications that are not native to the Windows® Operating System and are downloaded/installed to support desktop sharing.

AI agent 904 may be a locally installed and operated AI tool that interacts with call-taker computing system 204 to facilitate the capture of CAD image data 141, according to an embodiment. AI agent may include software and/or an application that can take actions autonomously to accomplish goals (e.g., capture and transmit image data). AI agent 904 may use one or more LLMs to perform particular operations (e.g., to act as the agent's brain) but includes the ability to use tools, make plans, and take sequential actions. AI agent 904 may include instructions (e.g., agent logic 910) that enable AI agent 904 to call APIs, run code, search the web, and/or interact with databases to provide CAD image data 141 to ERDS 102 for processing. AI agent 904 may include instructions (e.g., agent logic 910) that enable decision-making about what steps to take next based on feedback, for example. As an illustrative example, AI agent 904 may run from a software platform (e.g., Ollama, Llamafile, text-generation-webui, AnythingLLM, etc.) locally and have access to tools like file systems, web browsers, or APIs. AI agent 904 may include an orchestration layer that decide what actions to take, while the local LLM 220 provides the reasoning capabilities.

Figure 10:
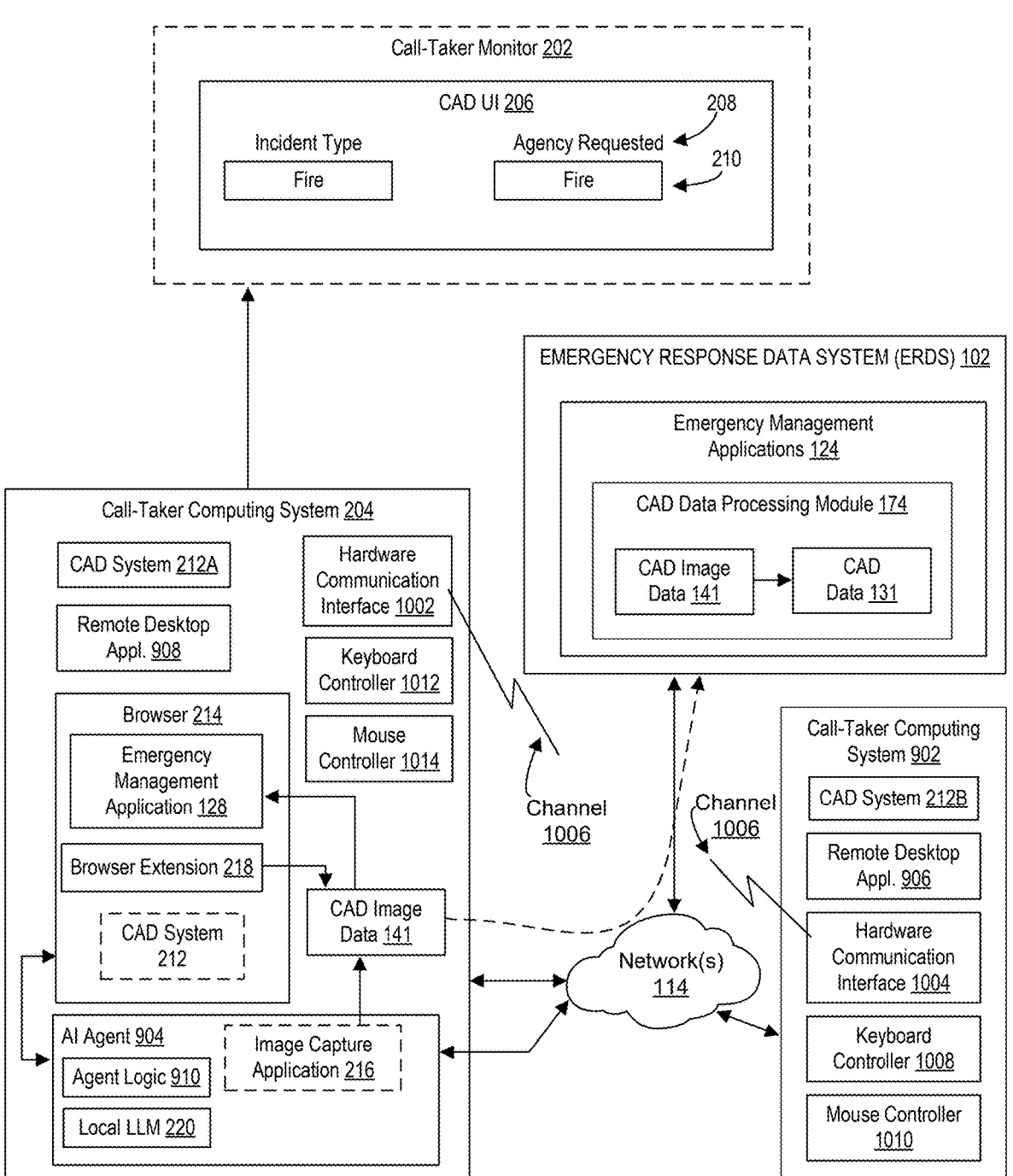
FIG. 10 illustrates an example diagram of a CAD interface system, in accordance with embodiments of the disclosure.

FIG. 10 illustrates a CAD interoperability system 1000, in accordance with aspects of the disclosure. CAD interoperability system 1000 may include one or more of any of the other components, operations, and/or operability disclosed herein. CAD interoperability system 1000 includes a hardware communication interface 1002 and a hardware communication interface 1004 that establish a channel 1006 between call-taker computing system 204 and call-taker computing system 206 to enable AI-based interfacing with CAD system 212, in accordance with aspects of the disclosure.

In one embodiment, AI agent 904 uses hardware communication interface 1002 to access CAD system 212A (locally running CAD system) to populate fields, select buttons, manipulate drop down menus, manipulate other menus, manipulate sliders, and/or interact with other human interface UI elements of call-taker computing system 204. AI agent 904 may receive emergency data from, for example, ERDS 102 to populate CAD system 212A. The emergency data may originate from another CAD system to enable CAD to CAD interoperability by pulling, requesting, receiving, or otherwise acquiring emergency data from a first CAD system and entering the emergency data into a second CAD system (e.g., CAD system 212A), for example. AI agent 904 may include instructions (e.g., prompts) and access to API and tools to send instructions for data entry to keyboard controller 1012 and mouse controller 1014 of call-taker computing system 204. While AI agent 904 enters information (e.g., emergency data) into CAD system 212A, CAD UI 206 may display the entered data and enable a user to visually confirm the emergency data entered into CAD system 212A.

In one embodiment, AI agent 904 uses hardware communication interface 1004 to access CAD system 212B (operating on call-taker computing system 902) to populate fields, select buttons, manipulate drop down menus, manipulate other menus, manipulate sliders, and/or interact with other human interface UI elements of call-taker computing system 902. AI agent 904 may receive emergency data from, for example, ERDS 102 to populate CAD system 212B. The emergency data may originate from another CAD system to enable CAD to CAD interoperability by pulling, requesting, receiving, or otherwise acquiring emergency data from a first CAD system and entering the emergency data into a second CAD system (e.g., CAD system 212B), for example. In another embodiment, various emergency data received and/or collected by ERDS 102 may be used to populate CAD system 212B. AI agent 904 may include instructions (e.g., prompts) and access to API and tools to send instructions for data entry to keyboard controller 1008 and/or mouse controller 1010 of call-taker computing system 902 to perform actions (e.g., dispatch emergency resources) and/or enter/export CAD data. While AI agent 904 enters information (e.g., emergency data) into CAD system 212B, CAD UI 206 may display the entered data and enable a user to visually confirm the emergency data entered into CAD system 212B though a remote desktop and/or virtual private network connection. In one embodiment, AI agent 904 accesses keyboard controller 1008 and/or mouse controller 1010 through a remote desktop connection between call-taker computing system 205 and call-taker computing system 902.

Hardware communication interfaces 1002 and 1004 may include universal serial bus (USB) devices, Bluetooth communication devices, and/or WiFi communication devices, for example. The Bluetooth communication devices may create a peer-to-peer network that enables keyboard/mouse sharing over communications channel 1006 and/or with software solutions such as Barrier, Deskflow, or the like. WiFi communication devices may be implemented as USB WiFi adapters that establish a WiFi Direct, Ad-Hoc network, and/or other peer-to-peer network that enables keyboard/mouse sharing over communications channel 1006, for example.

Figure 11:
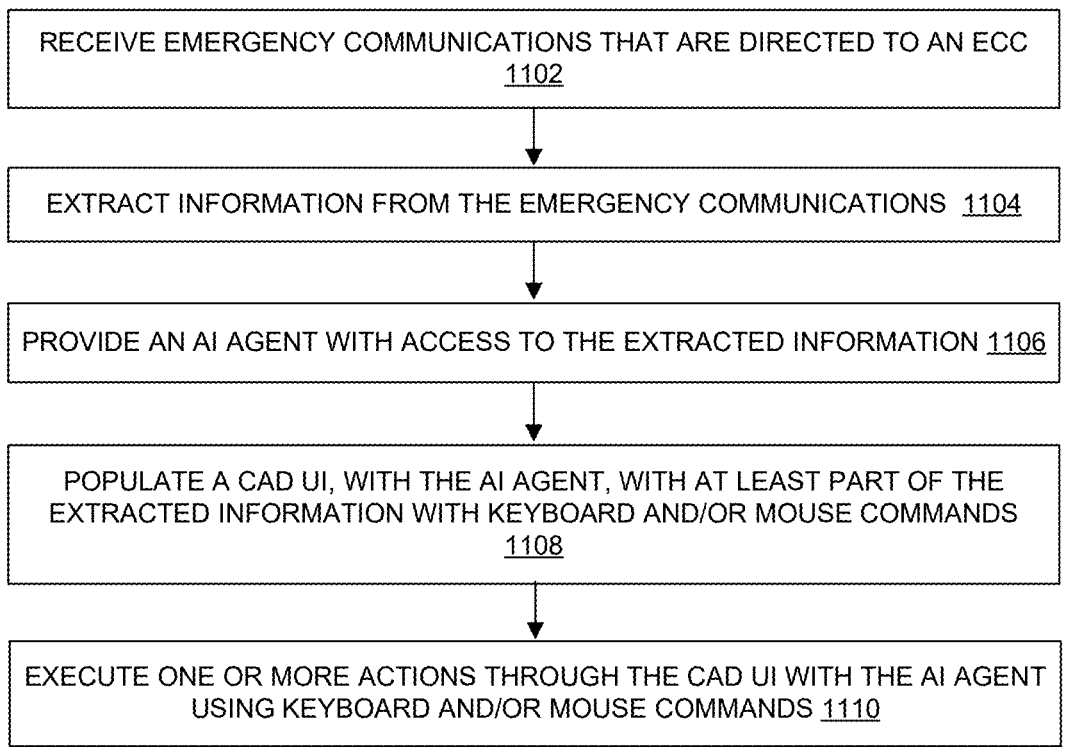
FIG. 11 illustrates an example flow diagram of a process for AI-based interfacing with CAD systems, in accordance with embodiments of the disclosure.

FIG. 11 illustrates a flow diagram of a process 1100 for AI-based interfacing with CAD systems, in accordance with aspects of the disclosure. Process 1100 may be operated using a combination of one or more components, operations, and/or systems disclosed herein.

At operation 1102, process 1100 receives emergency communications that are directed to an emergency communications center (ECC), according to an embodiment. Emergency communications may include telephone calls and/or text-based messages, according to an embodiment. An ERDS may receive emergency communications directed to the ECC with a transmitter that forwards, for example, session initiation protocol (SIP) packets of live call audio from the ECC to the ERDS. The live call audio may include a conversation between a 911 caller and a call-taker at an ECC.

At operation 1104, process 1100 extracts information from the emergency communications, according to an embodiment. Information may be extracted from the live call audio by applying the live call audio to a transcription engine and/or to an AI model having instructions to transcribe the live call audio. If the emergency communications is a text-based message, the information may be extracted by applying the text-based message to an AI model having instructions to summarize and/or extract caller intent, caller address/location, emergency details, and the like.

At operation 1106, process 1100 provides an AI agent with access to the extracted information, according to an embodiment. The information may be provided to the AI agent from an emergency management application and/or from an ERDS using API calls, by pushing the information to the AI agent, and/or by otherwise having a communication channel that shares the information with the AI agent. The AI agent may be operated by a call-taker computing system, for example.

At operation 1108, process 1100 populate a CAD UI, with the AI agent, with at least part of the extracted information with keyboard and/or mouse commands, according to an embodiment. The keyboard and/or mouse commands may be accessible to the AI agent because the CAD system of the CAD UI is operated on the same computing system as the AI agent. If the computing system that operates the AI agent differs from the computing system that operates the CAD system, then the AI agent may access the keyboard and/or mouse commands that control the CAD system through a remote desktop connection and/or through hardware communications devices (e.g., USB WiFi adapters, Bluetooth adapters, peer-to-peer software, etc.), in accordance with aspects of the disclosure.

At operation 1110, process 1100 executes one or more actions through the CAD UI with the AI agent using keyboard and/or mouse commands. One or more actions may include: selecting a dispatch button in the CAD UI to dispatch emergency responders/resources; report running; and perform data verification.

An example user prompt for an AI agent could include illustrative features such as: ""Navigate to the CAD UI at https(colon)//CADprogram(dot)com/ECC123, and fill it out with the emergency data delivered to an emergency management application called Unite that is accessible at https (colon)//unite(dot)rapidsos(dot)com/ECC123. When the CAD UI is sufficiently filled out according to the dispatch procedures of ECC123, click the Dispatch button on the CAD UI."

In response to the above example user prompt, the AI agent may process the instructions, analyze the underlying webpage code of the CAD UI, analyzed the underlying webpage code of the Unite application, and execute a sequence of actions, according to an embodiment. The sequence of actions may include:

Action: GO_TO_URL https(colon)//CADprogram(dot) com/ECC123;
Action: TYPE_TEXT (text: "John Doe", at: Name field);
Action: TYPE_TEXT (text: "structural fire", at: Emergency Type field);
Action: TYPE_TEXT (text: "123 Main St. Autumn, AL", at: Address field)
Action: CLICK (on: Dispatch button).

The AI agent may use a variety to technical techniques to enter data into a CAD system. The AI agent may use a X/Y coordinate within the CAD UI or within a monitor to determine where to perform a mouse CLICK action and to enter data. The AI agent may use a label in the underlying code for the CAD UI to enter a value associated with the label. The AI agent may perform a CLICK action or a TAB action to navigate between various fields within the CAD UI, for example. Other actions that the AI agent may perform include, but are not limited to SCROLL, PRESS-_KEY (e.g., for TAB), and KEY_PRESS (e.g., for ENTER), according to embodiments.

Figure 12:
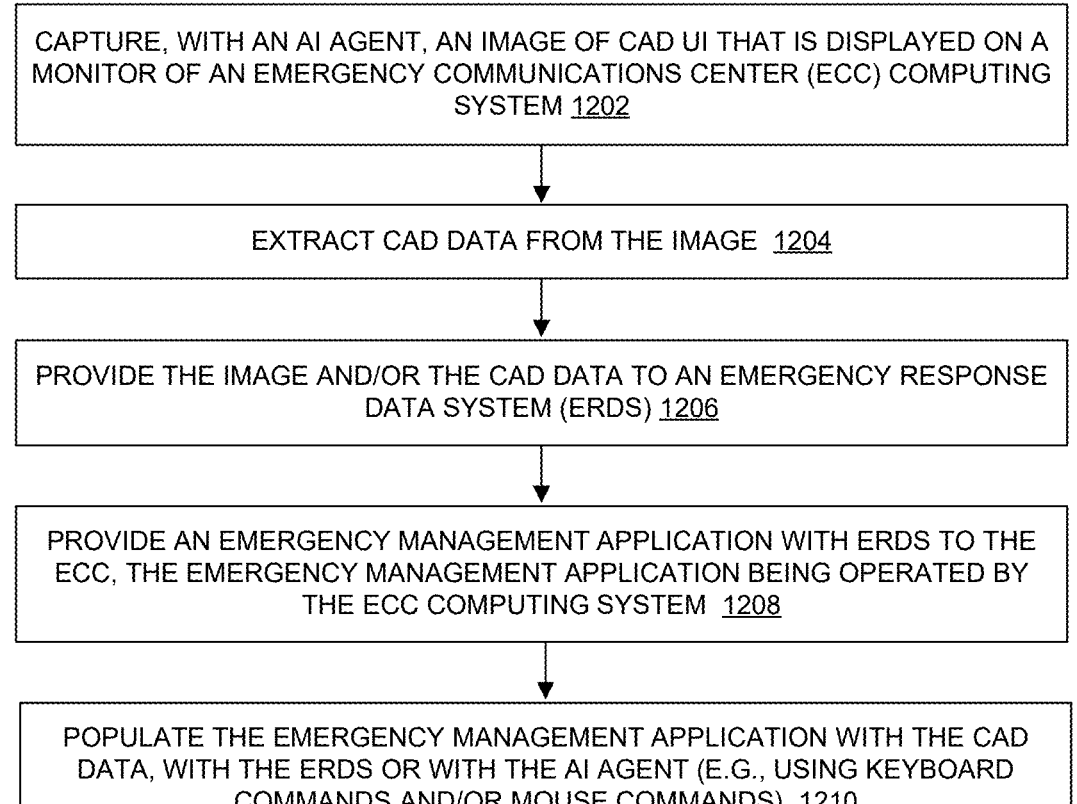
FIG. 12 illustrates an example flow diagram of a process for AI-based interfacing with CAD systems, in accordance with embodiments of the disclosure.

FIG. 12 illustrates a flow diagram of a process 1200 for AI-based interfacing with CAD systems, in accordance with aspects of the disclosure. Process 1200 may be operated using a combination of one or more components, operations, and/or systems disclosed herein.

At operation 1202, process 1200 captures, with an AI agent, an image of a CAD UI that is displayed by an emergency communications center (ECC) computing system, according to an embodiment.

At operation 1204, process 1200 extracts CAD data from the image, according to an embodiment. CAD data may be extracted from the image by the AI agent operated on the ECC computing system or by an AI agent operated on a different ECC computing system. The AI agent may perform optical character recognition (OCR) operations to decipher text from the image. The AI agent may use an OCR tool or software application to delegate OCR operations.

In some implementations, the AI agent performs a training operation on the CAD UI to map data fields within the CAD UI with a map of data fields to align extracted CAD data values with destination data fields (e.g., for a protocol tool, a destination CAD UI, emergency management UI, etc.). The AI agent performs training on the CAD UI to enable the AI agent to be able to "parse" or understand the captured images of the CAD system and translate those into mouse, keyboard, and/or other standard human interface instructions. Accordingly, the AI agent may interface with the CAD UI in the same way a human would. The AI agent training may include performing interface identification operations to identify UI elements such as buttons, dropdowns menus, other menus, sliders, text input boxes, etc. to enable controlling the mouse, keyboard, and/or other interfaces to take any action within the CAD that a human can take. The AI agent training may include training the AI agent to be able to manipulate UI elements to enable the AI agent to perform dispatch actions, report running, data verification, and/or any action a human would be able to take inside the CAD UI.

At operation 1206, process 1200 provides the image and/or the CAD data to an emergency response data system (ERDS), according to an embodiment. The CAD data may be extracted from the image by the ERDS, which provides/ hosts an emergency management application for the ECC. The ERDS receives the image from the ECC computing system and/or from the AI agent, according to an embodiment.

At operation 1208, process 1200 provides, with the ERDS, an emergency management application to the ECC for operation by the ECC computing system, according to an embodiment.

At operation 1210, process 1200 populates the emergency management application with the CAD data, with the ERDS or with the AI agent (e.g., using keyboard commands and/or mouse commands), according to an embodiment. The ERDS may assign key:value pairs to the CAD data, may associate the keys of the CAD data with labels within the emergency management application, and may enter values associated with the labels that correspond to the keys (and key:value pairs) of the CAD data. In other words, the ERDS may associate the key:value pairs of the CAD data with label: value pairs used for providing data in the emergency management application, according to an embodiment.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" and/or "data processing hardware" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure. One or more aspects of the data processing hardware and/or processing logic and/or logic may be distributed between multiple computing systems and/or servers.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device or system may include a desktop computer, a laptop computer, a tablet, a phablet, a smartphone, a feature phone, a server computer, or otherwise. A server computing system may be located remotely in a data center, may be stored locally, and/or may have components (e.g., processors, memory, network interfaces, etc.) that are distributed across one or more locations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for providing an artificial intelligence (AI)-based computer aided dispatch (CAD) data interface at an emergency communication center (ECC), comprising:

operating a browser extension on a web browser operating on the ECC computing system; and communicating a request, from the browser extension, to the image capture application to capture the image of a CAD UI;

capturing an image of a computer-aided dispatch (CAD) user interface (UI) of a CAD program operating by an ECC computing system;

wherein capturing an image of a CAD UI includes: operating an image capture application operating on the ECC computing system; and capturing a screenshot of the CAD UI, using the image capture application, to generate the image of the CAD UI;

transmitting image data from ECC computing system to a data processing server, the image data representing the image of the CAD UI;

providing the image data to an AI model for data extraction from the image;

providing instructions to the AI model to extract CAD data from the image, the CAD data representing data displayed by the CAD UI when the image was captured; and receiving the CAD data from the AI model to facilitate response to an emergency incident.

2. The computer-implemented method of claim 1, wherein providing the image data to the AI model includes providing the image data to an AI agent having one or more AI models.

3. The computer-implemented method of claim 2, wherein the AI agent is operable to use one or more large language models (LLMs) or one or more machine learning algorithms.

4. The computer-implemented method of claim 1, wherein capturing an image of a CAD UI includes:

operating a browser extension on a web browser operating on the ECC computing system; and capturing a screenshot of the CAD UI, using the browser extension, to generate the image of the CAD UI.

5. The computer-implemented method of claim 1, further comprising:

detecting a new incident received at the ECC; and triggering capture of the image of the CAD UI based on the new incident.

6. The computer-implemented method of claim 5, wherein detecting the new incident is based on at least one of ANI (automatic number identification) data, ALI (automatic location identification) data; CDR (call detail record) data, or SIP (session initiation protocol) data.

7. The computer-implemented method of claim 1, further comprising:

providing an emergency management application operating on the ECC computing system to display an emergency management user interface (UI) at the ECC; and transmitting the image data, with the emergency management application, from the ECC computing system to the data processing server.

8. The computer-implemented method of claim 1, wherein the CAD program is a first CAD program, wherein the ECC computing system is a first ECC computing system, the method further comprising:

transmitting the CAD data to a second CAD program operating by a second ECC computing system to enable CAD-to-CAD interoperability.

9. The computer-implemented method of claim 1, further comprising:

populating data fields of an intake procedure tool using at least part of the CAD data, wherein the intake procedure tool is integrated into an emergency management application operable by the ECC computing system and hosted by the data processing server.

10. The computer-implemented method of claim 1, wherein capturing the image data includes capturing the image data with an AI agent operating on the computing system.

11. The computer-implemented method of claim 10, wherein transmitting the image data includes transmitting the image data with the AI agent to the data processing server.

12. A computer-implemented method for providing an artificial intelligence (AI)-based computer aided dispatch (CAD) data interface at an emergency communication center (ECC), comprising:

operating a browser extension on a web browser operating on the ECC computing system; and communicating a request, from the browser extension, to the image capture application to capture the image of a CAD UI;

capturing, with a first AI agent, an image of a computer-aided dispatch (CAD) user interface (UI) of a CAD program, wherein capturing an image of a CAD UI includes:

operating an image capture application operating on the ECC computing system; and capturing a screenshot of the CAD UI, using the image capture application, to generate the image of the CAD UI;

wherein the CAD UI is displayed by a first ECC computing system, wherein the first AI agent is operated by the first ECC computing system, wherein the CAD program is operated by a second ECC computing system;

extracting the CAD data from the CAD image using the first AI agent or a second AI agent, wherein the second AI agent is operated by a data processing server;

storing the CAD data with the data processing server; and populating a target application with at least part of the CAD data, wherein the target application is at least one of: an emergency response application operable by the first computing system, a second CAD program, or a protocol form to facilitate response to an emergency incident.

13. The computer-implemented method of claim 12, wherein first ECC computing system is communicatively coupled to the second ECC computing system with a remote desktop application, wherein the CAD UI is displayed by the first ECC computing system using the remote desktop application.

14. The computer-implemented method of claim 12, wherein the first AI agent is operable to use one or more large language models (LLMs) or one or more machine learning algorithms.

15. A computer-implemented method for providing an artificial intelligence (AI)-based computer aided dispatch (CAD) data interface at an emergency communications center (ECC), comprising:

receiving, with a data processing server, emergency response data representative of a 911 call initiated with an emergency communications center (ECC);

providing an AI agent operable on an ECC computing system at the ECC;

providing the AI agent with access to the emergency response data; and populating, with the AI agent, a target application with at least part of the emergency response data, wherein the target application is at least one of: an emergency response application operable by the ECC computing system, a CAD program, or a protocol form to facilitate response to an emergency incident; wherein the ECC computing system is a first ECC computing system, the method further comprising: executing, with the AI agent, keyboard commands operable on the first ECC computing system or on a second ECC computing system to populate the target application with the at least part of the emergency response data, wherein the CAD program is operated by the second ECC computing system; and establishing peer-to-peer communications between the first ECC computing system and the second ECC computing system using hardware communications interfaces.

16. The computer-implemented method of claim 15, wherein the hardware communications interfaces include at least one of universal serial bus (USB) WiFi devices or USB Bluetooth devices, wherein a first of the hardware communications interfaces is coupled to the first ECC computing system and a second of the hardware communications interfaces is coupled to the second ECC computing system to support the peer-to-peer communications.

17. The computer-implemented method of claim 15, further comprising:

receiving live call audio for the 911 call; and transcribing the live call audio to identify the emergency response data related to the 911 call.

18. The computer-implemented method of claim 15, further comprising:

storing at least part of the emergency response data in a data structure; and providing access to the data structure to the AI agent to enable the AI agent to retrieve the emergency response data from the data structure.

* * * * *